(12) United States Patent
Sahayaraj et al.

(10) Patent No.: US 11,675,980 B2
(45) Date of Patent: Jun. 13, 2023

(54) BIAS IDENTIFICATION AND CORRECTION IN TEXT DOCUMENTS

(71) Applicant: INTERNATIONAL BUSINESS MACHINES CORPORATION, Armonk, NY (US)

(72) Inventors: Sanjana Sahayaraj, Chennai (IN); Alexandre Rademaker, Rio de Janeiro (BR); Joshua F. Payne, San Antonio, TX (US); Ashish Kundu, Elmsford, NY (US); Arjun Natarajan, Old Tappan, NJ (US)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 17/113,137

(22) Filed: Dec. 7, 2020

(65) Prior Publication Data

US 2022/0180068 A1 Jun. 9, 2022

(51) Int. Cl.
*G06F 40/30* (2020.01)
*G06F 40/166* (2020.01)

(52) U.S. Cl.
CPC ............ *G06F 40/30* (2020.01); *G06F 40/166* (2020.01)

(58) Field of Classification Search
None
See application file for complete search history.

(56) References Cited

U.S. PATENT DOCUMENTS

| 10,242,260 | B1 * | 3/2019 | Shen | G06F 40/205 |
| 10,430,464 | B1 | 10/2019 | Ravi | |
| 11,030,404 | B1 * | 6/2021 | Garg | G06F 40/289 |
| 11,270,080 | B2 * | 3/2022 | Rao | G06F 16/9032 |
| 2017/0039297 | A1 | 2/2017 | Koutrika | |
| 2018/0330729 | A1 | 11/2018 | Golipour | |
| 2020/0125639 | A1 * | 4/2020 | Doyle | G06F 40/30 |
| 2021/0097239 | A1 * | 4/2021 | Arora | G06F 40/30 |

OTHER PUBLICATIONS

Hu et al., "Enhanced Word Embedding Method in Text Classification" 2020 6th International Conference on Big Data and Information Analytics (BigDIA), copyright 2020 IEEE, p. 18-22. (Year: 2020).*

(Continued)

*Primary Examiner* — Amelia L Tapp
(74) *Attorney, Agent, or Firm* — Caleb D. Wilkes

(57) ABSTRACT

A method, computer system, and a computer program product for text bias identification and correction are provided. A first text corpus may be received. A designation of a second text corpus may be received. Words of the first text corpus may be embedded as a first word embedding in an embedding model. The first word embedding may be compared to a second word embedding in the embedding model to identify a first biased text in the first text corpus. The second word embedding may be from the second text corpus. A first replacement text portion may be generated as a substitute for the first biased text. The first replacement text portion may include a first unbiased text. The first biased text and the first replacement text portion may be presented.

20 Claims, 7 Drawing Sheets

(56) References Cited

OTHER PUBLICATIONS

Flisar et al., "Identification of Self-Admitted Technical Debt Using Enhanced Feature Selection Based on Word Embedding" IEEE, Aug. 16, 2019, pp. 1-20. (Year: 2019).*
Huang et al., "Leveraging Conceptualization for Short-Text Embedding" IEEE Transactions on Knowledge and Data Engineering, vol. 30, No. 7, Jul. 2018, pp. 1282-1295. (Year: 2018).*
Abu-El-Haija et al., "Watch Your Step: Learning Node Embeddings via Graph Attention," 32nd Conference on Neural Information Processing Systems (NeurIPS 2018), Montréal, Canada, pp. 1-11.
Bellamy et al., "AI Fairness 360: An Extensible Toolkit for Detecting, Understanding, and Mitigating Unwanted Algorithmic Bias," arXiv:1810.01943v1 [cs.AI] Oct. 3, 2018, Retrieved from the Internet: <https://arxiv.org/pdf/1810.01943.pdf>, 20 Pages.
Dai et al. "Adversarial Network Embedding," The Thirty-Second AAAI Conference on Artificial Intelligence (AAAI-18), 2018, Association for the Advancement of Artificial Intelligence (www.aaai.org)., pp. 2167-2174.
Defferrard et al., "Convolutional Neural Networks on Graphs with Fast Localized Spectral Filtering," 30th Conference on Neural Information Processing Systems (NIPS 2016), Barcelona, Spain, 9 pages.
Goodfellow et al., "Generative Adversarial Nets," arXiv:1406.2661v1 [stat.ML] Jun. 10, 2014, Retrieved from the Internet: <https://arxiv.org/pdf/1406.2661v1.pdf>, 9 pages.
Grover et al., "node2vec: Scalable Feature Learning for Networks," arXiv:1607.00653v1 [cs.SI] Jul. 3, 2016, Retrieved from the Internet: <http://dx.doi.org/10.1145/2939672.2939754>, 10 pages.
Hamilton et al., "Inductive Representation Learning on Large Graphs," arXiv:1706.02216v4 [cs.SI] Sep. 10, 2018, 31st Conference on Neural Information Processing Systems (NIPS 2017), Long Beach, CA, USA, 19 pages.
Karve et al., "Conceptor Debiasing of Word Representations Evaluated on WEAT," arXiv:1906.05993v1 [cs.CL] Jun. 14, 2019, Retrieved from the Internet: <https://arxiv.org/pdf/1906.05993.pdf>, 9 pages.
Kurita et al. "Measuring Social Biases in Contextual Word Representations," Proceedings of the 1st Workshop on Gender Bias in Natural Language Processing, Association for Computational Linguistics, Aug. 2, 2019, pp. 166-172.
Li et al., "Learning distributed word representation with multi-contextual mixed embedding," Knowledge-Based Systems, vol. 106, Elsevier B.V., May 24, 2016, Retrieved from the Internet: <http://dx.doi.org/10.1016/j.knosys.2016.05.045>, pp. 220-230.
Mell et al., "The NIST Definition of Cloud Computing", National Institute of Standards and Technology, Special Publication 800-145, Sep. 2011, 7 pages.
Perozzi et al., "DeepWalk: Online Learning of Social Representations," arXiv:1403.6652v2 [cs.SI] Jun. 27, 2014, KDD'14, Retrieved from the Internet: <http://dx.doi.org/10.1145/2623330.2623732>, 10 pages.
Sap et al., "The Risk of Racial Bias in Hate Speech Detection," Proceedings of the 57th Annual Meeting of the Association for Computational Linguistics, Florence, Italy, Jul. 28-Aug. 2, 2019, pp. 1668-1678.
Scarselli et al., "The Graph Neural Network Model," IEEE Transactions on Neural Networks, vol. 20, No. 1, Jan. 2009, pp. 61-80.
Wang et al., "GraphGAN: Graph Representation Learning with Generative Adversarial Nets," arXiv:1711.08267v1 [cs.LG] Nov. 22, 2017, Association for the Advancement of Artificial Intelligence (www.aaai.org), 8 pages.
Jabalazs et al., "what is dimensionality in word embeddings," stack overflow, 2017-2018, Retrieved from the Internet on Dec. 3, 2020: <https://stackoverflow.com/questions/45394949/what-is-dimensionality-in-word-embeddings>, 6 pages.
Olah, Christopher, Deep Learning, NLP, and Representations, colah's blog, 2014, Retrieved from the Internet on Dec. 3, 2020: <http://colah.github.io/posts/2014-07-NLP-RNNs-Representations/#Word%20Embeddings>, 17 pages.

* cited by examiner

FIG. 3b

```
====== Local: ======
Increase: tensor([[-0.1379, 0.3452, 1.7768, -0.7599, -0.8090, -0.1010, -1.3973, -0.3774]],
     grad_fn=<EmbeddingBackward>)
Revenue: tensor([[-0.8326, -2.4020, 0.0879, 0.1177, 0.1253, -1.4054, 0.6380, -0.3619]],
     grad_fn=<EmbeddingBackward>)
Cosine Distance: tensor([1.6590], grad_fn=<AcosBackward>)

====== Global: ======
Increase: tensor([[-1.6095, -1.1956, 0.7786, -0.1570, -0.0322, 0.1817, 0.1981, -0.1707]],
     grad_fn=<EmbeddingBackward>)
Revenue: tensor([[1.0999, 1.0996, -1.4111, 1.5695, 0.1062, 0.7638, 0.2479, -0.3620]],
     grad_fn=<EmbeddingBackward>)
Cosine Distance: tensor([1.9248], grad_fn=<AcosBackward>)

====== Transformation: ======
Transformed local Increase: tensor([[-0.2061, 0.2770, 1.7085, -0.8282, -0.8773, -0.1692, -1.4656,
-0.4457]],
     grad_fn=<AddBackward>)
Cosine Distance: tensor([1.8542], grad_fn=<AcosBackward>)
```

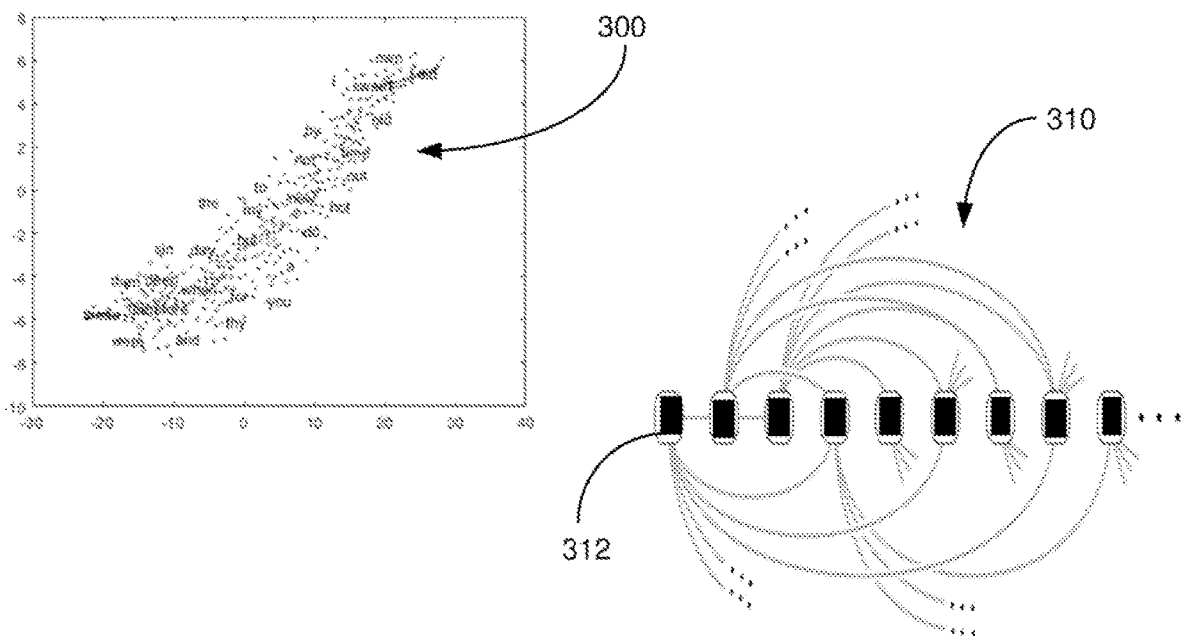

BIAS IDENTIFICATION AND CORRECTION IN TEXT DOCUMENTS

BACKGROUND

The present invention relates generally to the field of artificial intelligence for examining and improving text documents.

SUMMARY

According to one exemplary embodiment, a method for bias identification and correction in a text document is provided. The method may include receiving a first text corpus. A designation of a second text corpus may be received. Words of the first text corpus may be embedded as a first word embedding in an embedding model. The first word embedding may be compared to a second word embedding in the embedding model to identify a first biased text in the first text corpus. The second word embedding may be from the second text corpus. A first replacement text portion may be generated as a substitute for the first biased text. The first replacement text portion may include a first unbiased text. The first biased text and the first replacement text portion may be presented. A computer system and computer program product corresponding to the above method are also disclosed herein.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 3a shows an embedding of a text corpus according to at least one embodiment;

FIG. 3b shows calculations from the usage of a transformation function for comparing text corpora according to at least one embodiment;

FIG. 3c shows a bias graph according to at least one embodiment;

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, method and computer program product for text document bias identification and correction. The present embodiments have the capacity to improve the technical field of artificial intelligence for word processing and for text documents and to allow an owning body, e.g., an organization, of a text corpus to receive help from a machine learning model to debias a text document before the text document is released outwardly or to the public. The debiasing may include the removal and/or replacement of biased portions of the text. This debiasing may be referred to as a cleaning of the text. The present embodiments will enhance artificial intelligence for text documents or text corpuses by adding an additional capability to supplement the known capabilities of checking spelling in a text document and of checking for grammatical and formatting errors in a text document or a text corpus. The present embodiments will also facilitate tracking of bias levels in a text corpus and continual decrease of bias over time in documents for a business community, research community, or other community.

Figure 1:
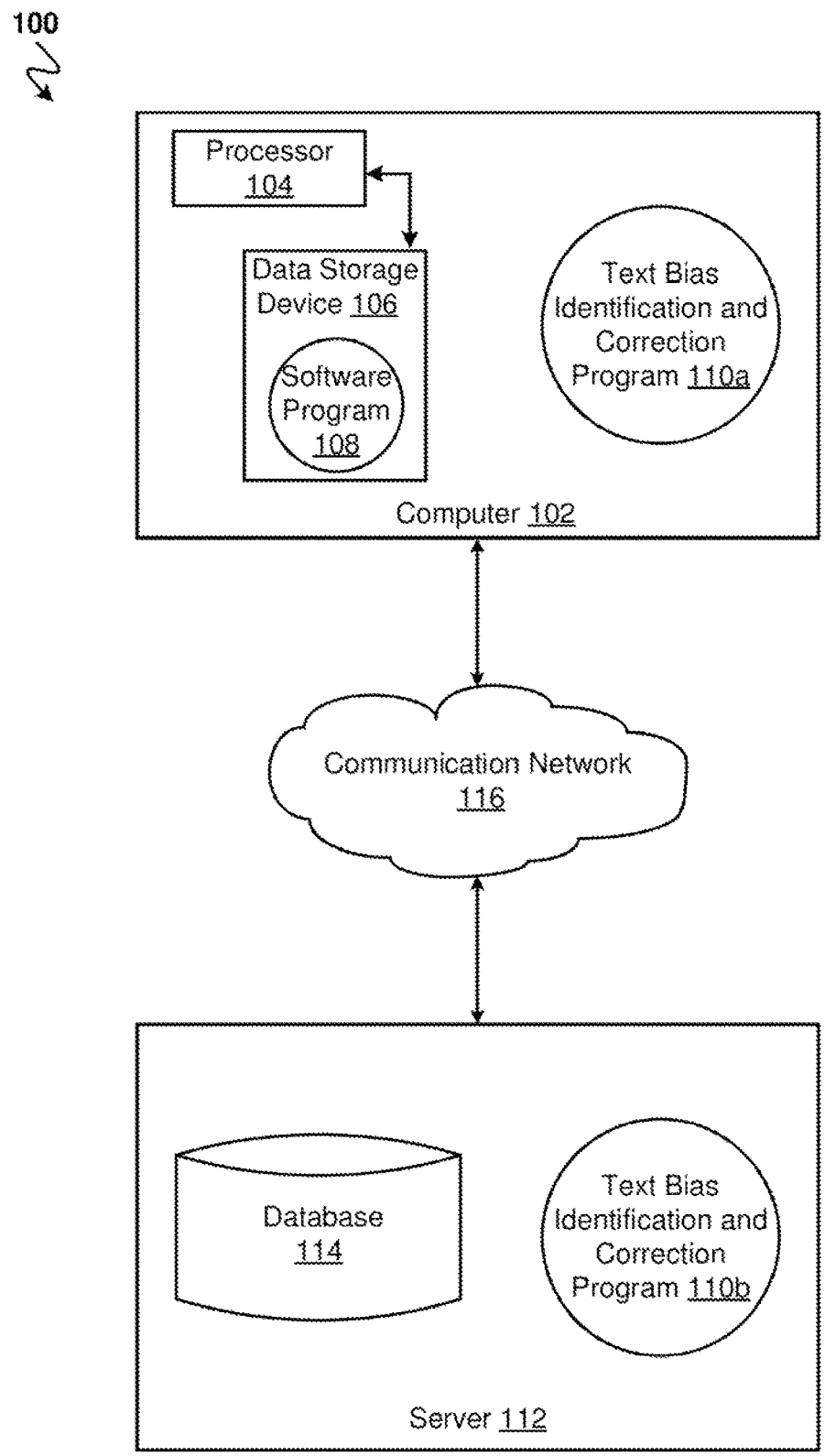
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a text document bias identification and correction program 110a. The networked computer environment 100 may also include a server 112 that is a computer and that is enabled to run a text document bias identification and correction program 110b that may interact with a database 114 and a communication network 116. The networked computer environment 100 may include a plurality of computers 102 and servers 112, although only one computer 102 and one server 112 are shown in FIG. 1. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server 112 via the communications network 116. The communications network 116 may include connections, such as wire, wireless communication links, or fiber optic cables. As will be discussed with reference to FIG. 5, server 112 may include internal components 902a and external components 904a, respectively, and client computer 102 may include internal components 902b and external components 904b, respectively. Server 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114 in a server 112 that is remotely located with respect to the client computer 102. According to various implementations of the present embodiment, the text document bias identification and correction program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the text document bias correction and identification program 110a, 110b (respectively) to identify bias in a text document and to facilitate correction of the bias that is identified. The process 200 for text document bias correction and identification is explained in more detail below with respect to FIGS. 2, 3, 4a, and 4b.

Bias may be defined at least in some embodiments as a particular term or a particular phrase whose occurrence does not follow accepted statistical distribution with respect to reference corpora or a reference standard. The reference standard may include gold data established by bias standards that are accepted in literature or by a research community. The reference standard may include natural or regular language data with human imposed debiasing criteria that may be referred to as human gold data. Examples of bias in a text document may include a document that explains company finances by emphasizing increases in revenues and by ignoring decreases in revenues. A reference corpus may provide an example of being unbiased in this regard, as a reference corpus may describe its revenue with respect to both increases and decreases. This broader description may be considered a fairer and more accurate representation of the finances of the company. Portions of the reference corpus may be used as replacement text that is generated to substitute for the biased portions of the financial report.

A text corpus may be defined in at least some embodiments as being a group of at least four sentences or a group of at least one or more paragraphs that contain one or more sentences.

Figure 2:
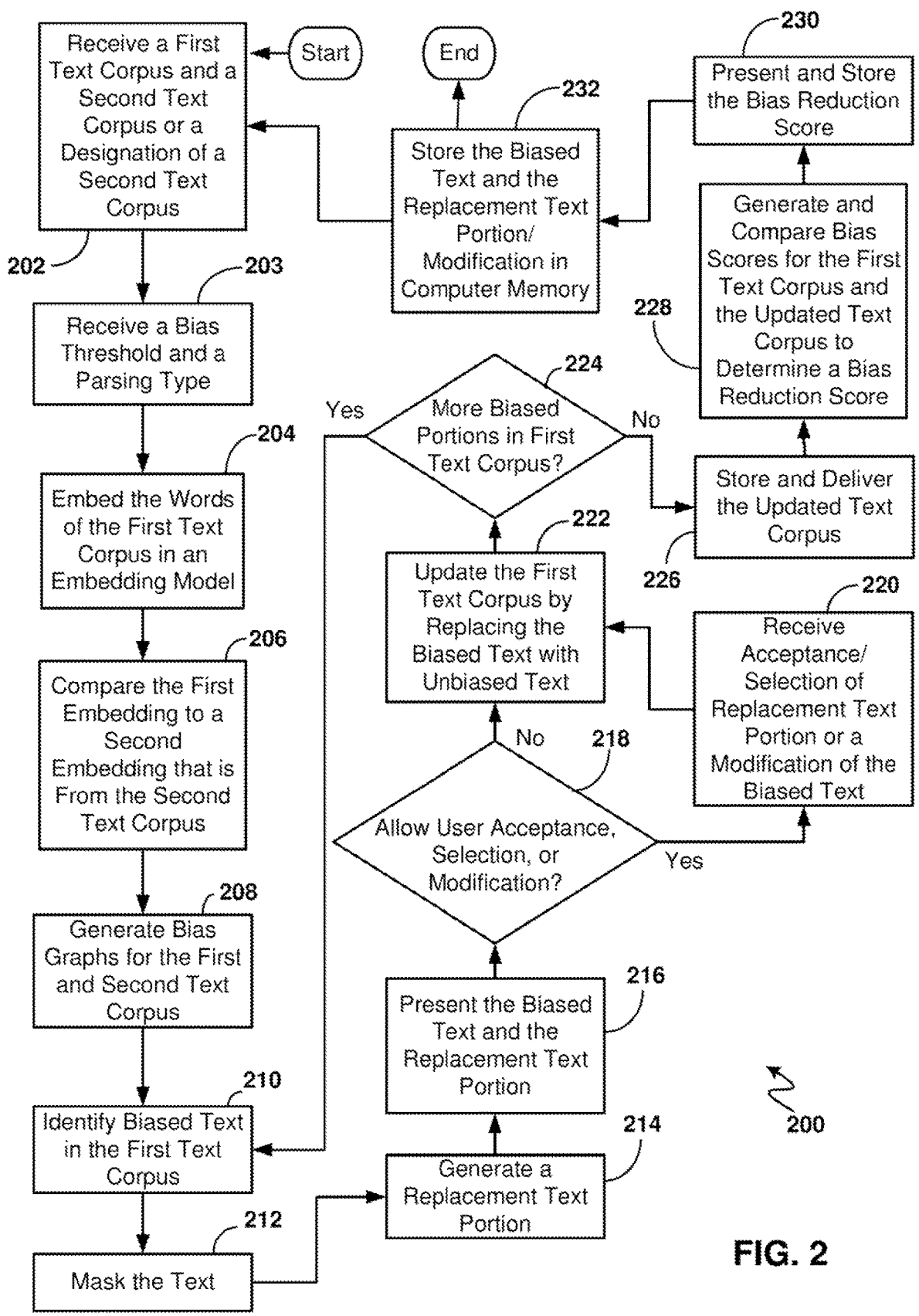
FIG. 2 is an operational flowchart illustrating a process for bias identification in a text document and correction of the bias according to at least one embodiment.

Referring now to FIG. 2, an operational flowchart depicts a process 200 that may, according to at least one embodiment, be performed by the text document bias identification and correction program 110a, 110b. It may be appreciated that FIG. 2 provides only an illustration of one embodiment and does not imply any limitations with regard to how different embodiments may be implemented. Many modifications to the depicted embodiment(s) may be made based on design and implementation requirements.

As described in embodiments above, the text document bias identification and correction program 110a, 110b may improve the functionality of a computer by enhancing word processing programs and artificial intelligence for text documents or text corpuses by adding an additional capability to supplement the known capabilities of checking spelling in a text document or a text corpus and checking for grammatical and formatting errors in a text document or a text corpus. The text document bias identification and correction program 110a, 110b also may allow user interaction to de-bias a text corpus that can be input into a sentiment analyzer. The text document bias identification and correction program 110a, 110b may be implemented in a model agnostic method that may be performed on a number of different models, e.g., from support-vector machines to neural network models.

In a step 202 of the process 200, a first text corpus is received and a second text corpus is designated or received. The first text corpus may be the document or text corpus that is to be examined for any bias. A user may upload this document or text corpus as a word processing program file into a web portal for the text document bias identification and correction program 110a, 110b. This first text corpus in at least some instances may be referred to as a local corpus or a local text corpus. A user may load such a file into a web portal via the computer 102. The receiving may occur via the text document bias identification and correction program 110a receiving an uploaded file at the computer 102 or via the text document bias identification and correction program 110b at the server 112 receiving a text corpus file that was transmitted via the communication network 116, e.g., that was transmitted from the computer 102 through the communication network 116 to the server 112.

The second text corpus is to be used as an example of an unbiased document or unbiased text corpus for the process 200. The second text corpus may also be uploaded as a word processing program file into a web portal for the text document bias identification and correction program 110a, 110b. A user may load such a file into a web portal via the computer 102. This second text corpus that is received or designated in at least some instances may be referred to as a global corpus or a global text corpus. This second text corpus may be considered an unbiased document, so that the second text corpus may be used as a dataset of text to train an embedding model, e.g., a neural network of a deep learning model. An embedding model may be a machine learning model with one or more embeddings. A news article may be an example of such an unbiased document that may in some embodiments be used as a second text corpus to train the artificial intelligence.

The receiving of the second text corpus may occur via the text document bias identification and correction program 110a receiving an uploaded second text corpus file at the computer 102 or via the text document bias identification and correction program 110b at the server 112 receiving a second text corpus file that was transmitted via the communication network 116, e.g., that was transmitted from the computer 102 through the communication network 116 to the server 112.

Alternatively, the second text corpus may have already been used by the text document bias identification and correction program 110a, 110b or may have already been stored in a memory of or associated with the text document bias identification and correction program 110a, 110b, e.g., may have already been stored in the data storage device 106 or in the database 114. In such instances, a user may use a graphical user interface (GUI) of the text document bias identification and correction program 110a, 110b to select a saved document as the second text corpus.

When a user accesses the text document bias identification and correction program 110a on the computer 102, a display prompt or GUI may be generated that requests a user to upload a text file as the first text corpus and in some instances to upload another text file as the second text corpus. This prompt or GUI may be displayed on a display monitor 924 (see FIG. 5) of the computer 102.

Figure 4A:
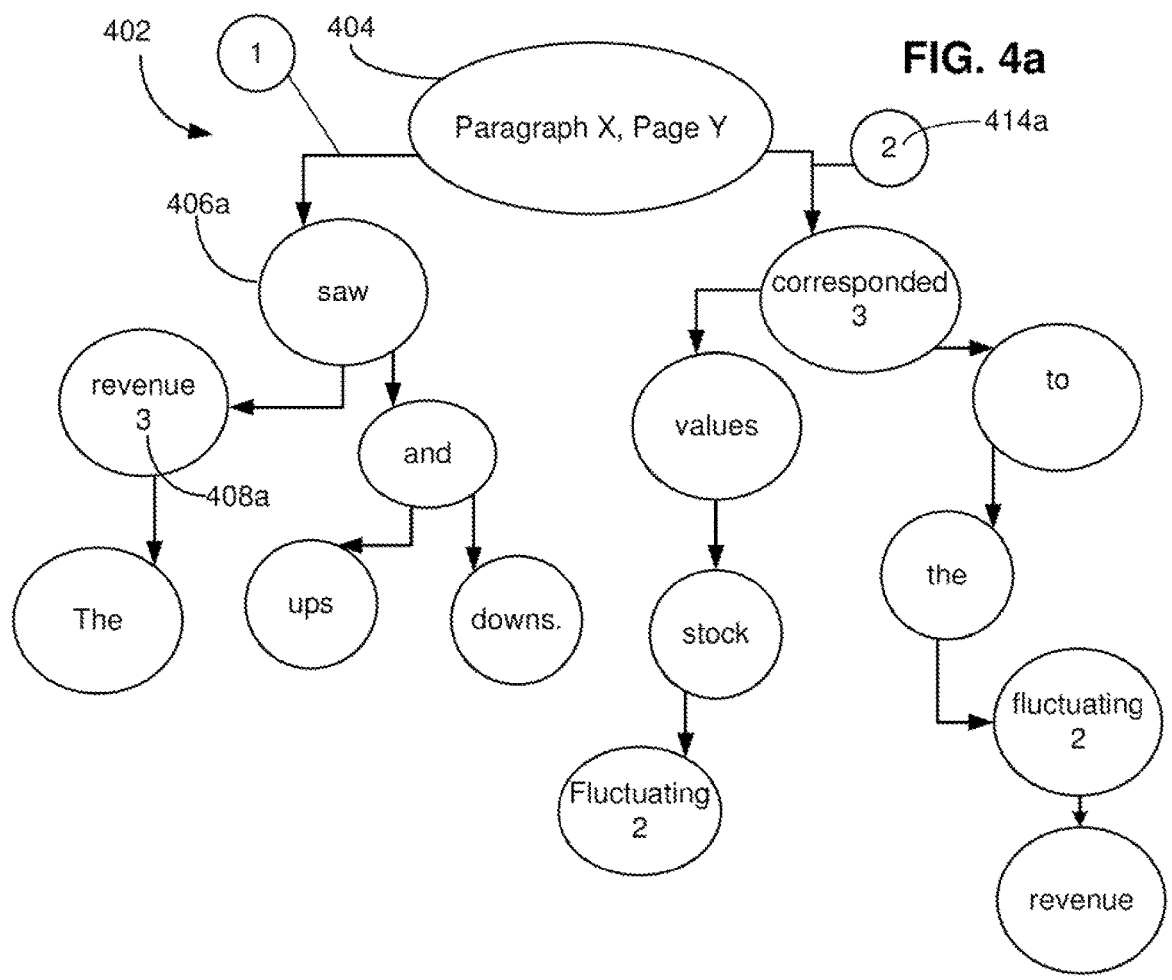
FIG. 4a shows an example of a portion of a bias graph for a global text corpus according to at least one embodiment.
Figure 4B:
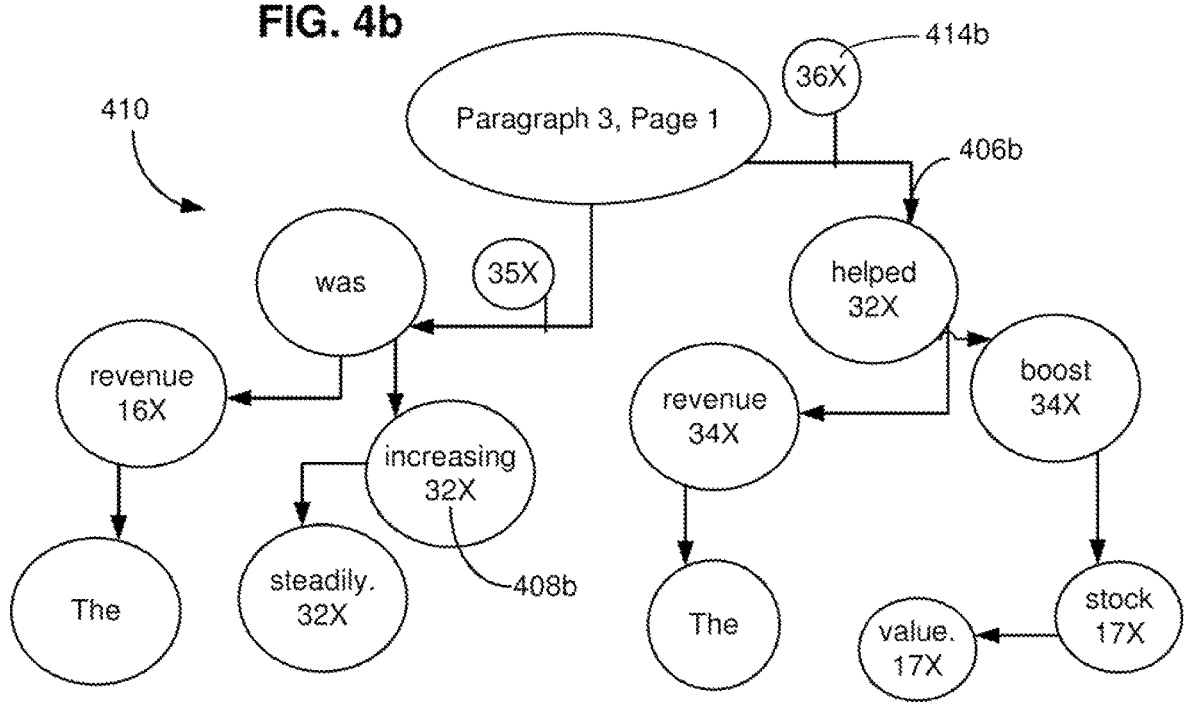
FIG. 4b shows an example of a portion of a bias graph for a local text corpus that needs debiasing according to at least one embodiment.

In a step 203 that is performed in some embodiments, a bias threshold and a parsing type are received. A GUI generated by the text document bias identification and correction program 110a may also include a slider or other input element that allows the user to input a bias threshold. This bias threshold indicates which degree of connected nodes or tokens of biased terms or biased term sets will be considered as being biased for the process 200. The bias threshold may alternatively be taken from a common standard on a blockchain version of the text document bias identification and correction program 110a, 110b. This bias threshold that is input serves as a parameter for a bias graph processing algorithm that helps generate a bias graph as will be described subsequently. This GUI may be displayed on a display monitor 924 of the computer 102. The bias graph is explained below with respect to step 208, and examples of a portion of such a bias graph are also shown in FIGS. 4a and 4b.

The GUI that may be displayed on a display monitor 924 of the computer 102 may also give the user an opportunity to specify whether syntactic parsing, semantic parsing, or a combination of syntactic and semantic parsing is to be used for construction of the bias graph. This parsing input serves as another parameter for the bias graph processing algorithm that helps generate the bias graph.

In some embodiments when no input is provided by the user for step 203, a default bias threshold amount and a default parsing type may be applied by the text document bias identification and correction program 110a.

In some embodiments, a user may, as a model pre-training step, identify or tag sets of words in the first text corpus as being biased. A GUI may be presented to the user, e.g., on a display monitor 924 of the computer 102, in order for the user to perform this tagging. In some embodiments, a user may via this GUI access a stored second text corpus to read this second text corpus and may provide an initial validation or acceptance of the second text corpus as an unbiased text corpus or as a global text corpus.

The GUI for uploading text corpus files, for inputting parameters regarding bias levels and desired parsing type, and for tagging pre-training may be referred to as a front-end GUI.

In a step 204 of the process 200, words of the first text corpus are embedded into an embedding model of the text document bias identification and correction program 110a, 110b as a first word embedding. FIG. 3a shows an example word embedding 300. Embeddings for a text corpus may in practice include a few hundred to a few thousand dimensions, although the example word embedding 300 shows two dimensions only for the sake of allowing visualization. Word embeddings may be an instance of distributed representation, with each word being its own one-dimensional vector. In word embeddings, based on the machine learning, words with similar meanings may be generated to have similar vectors. In at least some embodiments, all of the words of the first text corpus are embedded into the embedding model. In other embodiments, a majority of the words of the first text corpus are embedded into the embedding model. An embedding model may be a machine learning model with one or more embeddings. The embedding model may include or be part of a neural network, a recurrent neural network, a shallow neural network, a deep neural network, a vector adding machine, and/or a generative adversarial network (GAN). Word embeddings may be a dimensional space that may include vectors. When the words from the text corpus are represented as vectors in the dimensional space, mathematical operations may be performed on the vectors to allow quicker and computer-based comparison of text corpora. The word embeddings may also reflect the size of the vocabulary of the respective text corpus or of the portion of the text corpus fed into the embedding model, because a vector may be kept for each word in the vocabulary of the text corpus that is fed in or of the text corpus portion that is fed in. This vocabulary size is separate from the dimensionality. For example, a word embedding for a large text corpus may have one hundred dimensions and may have one hundred thousand respective vectors for one hundred thousand unique words. The dimensions for the word embedding may relate to how each word in the text corpus relates to other words in the text corpus.

The embedding of the words from the first text corpus may constitute a first word embedding and a local embedding in a local embedding space L. The embedding of the words may be referred to as bias embeddings which help establish bias metrics. The bias metrics facilitate the detection of and analysis of the bias. These word embeddings may be based on one or more of word position, count, and context for the vocabulary of the text corpus or text corpora. A word embedding that is based on all of word position, count, and context may provide the greatest debiasing power but may also require the most computational power. The positional basis may be excluded in some embodiments to reduce the required computing power. The count basis may assess a degree of skew or bias that is caused by any or some terms in the text corpus. The context basis may assess the terms or topics that are affected by the bias. The positional basis may assess semantics of bias. Storing the position of terms helps speed up the processing time, as it reduces a need to analyze and go through the sentence several times.

In a step 206 of the process 200, the first word embedding is compared in the embedding model to a second word embedding. The second word embedding may be an embedding of words from the second text corpus. The second word embedding may constitute a global embedding as it is an embedding from a global text corpus. This global embedding may be in a global embedding space G of the embedding model. This second word embedding may constitute a pre-training of the embedding model as part of unsupervised learning for the embedding model, e.g., as part of unsupervised learning for a neural network. The second word embedding should be created with the same embedding program or format that is used to create the first word embedding, or the first word embedding should be created with the same embedding program or format that is used to create the second word embedding. Thus, a first embedding program may be used to generate the first word embedding and to generate the second word embedding. Word embeddings may be a set of hundreds/thousands of dimensions and vectors, and the numbers of dimensions and vectors for both word embeddings may be on the same or a similar scale to allow plotting of the first and second word embeddings in a consistent multi-dimensional space. This consistency will, as described subsequently, allow a more accurate determination of what transformation for a word, sentence, or paragraph will bring a word from its place in a local word embedding to the position of the global word embedding in order to generate a debiased term.

As a part of the comparison of step 206, embedding vectors from the embedding that occurs in step 204 may be input into a bias detection model to ascertain a global bias encoding for each word in the corpus based on the local corpus embedding and the global corpus embedding. The bias detection model may be based on the global corpus embedding. As a part of step 206, the embedding model may use a function T that transforms elements in the local embedding space L to an intermediate embedding space I. The elements in the intermediate embedding space I are aligned with the distance and structure that are present for corresponding elements in the global embedding space G. The embedding model may receive training and may be taught how to perform this transformation. A distance function may be used to compute a distance and an angular difference between corresponding elements in the local embedding space L and the intermediate embedding space I. The values of the distance function may be embedded into a further embedding space of the embedding model, e.g., into a bias embedding space B. The embedding into the intermediate embedding space I may be considered a differential embedding method. FIG. 3b shows calculations from the usage of a transformation function that includes a distance function for comparing text corpora according to at least one embodiment.

In a hypothetical ideal, the intermediate embedding in the intermediate embedding space I would completely align with the global embedding in the global embedding space G. However, because the first text corpus will in practice not be identical to the second or global text corpus, the intermediate embedding will not perfectly match the global embedding. The machine learning model computes through trial and error what transformation is necessary to most closely align the intermediate embedding to the global embedding. Performing this transformation to the text of the first text corpus may remove the bias from the first text corpus.

In FIG. 3b, a first cosine distance calculation 302 is performed for the word set "Increase" and "Revenue" with respect to the local embedding that came from the first text corpus or from the local text corpus. A second cosine distance calculation 304 is performed for the word set "Increase" and "Revenue" with respect to the global embedding that came from the second text corpus or from the global text corpus which represents an unbiased corpus. A transformation calculation output 306 is performed with respect to the first cosine distance calculation 302, to the second cosine distance calculation 304, and to the increase and revenue vector information that are shown. The transformation calculation output 306 determines the transformation that is necessary for the first text corpus or the first embedding to change to match the second text corpus or the second embedding with respect to the word set "Increase" and "Revenue". The transformation may include changes to distances or angles of the word locations in the embedding space. FIG. 3b shows a simple set of tensor operations to transform the local embedding of "increase" to be closer to what is observed in the global unbiased text corpus. The cosine distance calculation is present in many programming language libraries and may be performed on an embedding for a text corpus. Tokens from the global embedding that are closer to the elements in the transformed embedding may be replacement candidates for the biased portions in the local embedding. FIG. 3b shows an example of when a text corpus is biased towards focusing on revenue increases while ignoring decreases in revenue that ideally would also be addressed. The global text corpus addressed the decreases in revenue while also describing the increases in revenue.

In a step 208 of the process 200, a bias graph for the first text corpus is created and a bias graph for the second text corpus is created. The bias graphs include nodes representing the words, e.g., each of the words, of the respective text corpus. The nodes are interconnected based on semantic and/or syntactic relationships and, therefore, the bias graphs include interconnected word elements similar to a text graph that can be used in natural language processing (NLP). FIG. 3c shows an example bias graph 310 which shows interconnected word elements. A first interconnected word element 312 is labeled. The bias graph may be considered a hierarchical graphical representation of bias relationships between all terms and phrases in a corpus of text. Each node or token, e.g., each interconnected word element, may include a respective bias score embodying the bias of that particular word element. The comparison of the first embedding to the second embedding that takes place in step 206 may generate the bias scores for the particular word elements or word sets, and those bias scores may be used as inputs to help generate the bias graphs in step 208. The bias scores may be part of bias metrics for the analysis. The bias scores quantify an amount of bias contained in the word or word set. Examples of bias scores for particular words and word sets are provided subsequently, e.g., in FIGS. 4a and 4b and the accompanying description. A high bias score may indicate a higher amount of bias in the particular word or word sets. The bias graph may help locate portions of the corpus, e.g. phrases or sentences, that are affected by the skewed or biased representation of certain terms. The bias graph representation helps identify the entire coherent piece of language (phrase or sentence) that is related to a biased term. Thus, the bias graph helps keep syntax and semantics in order for the updated text corpus that is produced via the bias correction.

FIG. 4a shows an example of a portion of a global bias graph 402 that includes unbiased description of financial documents of a company. The portion of the global bias graph 402 includes a central node 404 indicating the location of this portion of text in the overall financial document. The nodes stemming from the left arrow from the central node 404 are at the location indicated (i.e., in paragraph X of page Y) in the central node 404 and together form a sentence "The revenue saw ups and downs." The nodes stemming from the right arrow from the central node 404 are also at the location indicated (i.e., in paragraph X of page Y) in the central node 404 and together form a sentence "Fluctuating stock values corresponded to the fluctuating revenue." A first node 406a represents the word "saw" that is used in the above-mentioned left sentence from this paragraph of the global text corpus. Each node or some nodes may include a bias score. For example, in the left sentence the node for the word "revenue" includes a first score 408a that is "3". Other nodes in the right sentence include scores such as 3 or 2. In some embodiments, no bias score will be shown for certain nodes such as those representing an indefinite article. In other embodiments, every node may include a bias score.

FIG. 4b shows an example of a portion of a local bias graph 410 that is made for a text portion that includes biased description of financial documents of a company. The portion of the local bias graph 410 includes a root node indicating the location of this portion in the overall financial document as being Paragraph 3, Page 1 of the financial document. The nodes stemming from the left arrow from the root node are located in Paragraph 3, Page 1 of the financial document and together form a sentence "The revenue was increasing steadily." The nodes stemming from the right arrow from the root node are also in the Paragraph 3, Page 1 of the financial document and together form a sentence "The revenue helped boost stock value." A second node 406b represents the word "helped" that is used in the above-mentioned right sentence from this Paragraph 3, Page 1 of the local text corpus. Each node or some nodes may include a bias score. For example, in the left sentence the node for the word "revenue" includes a score "16X" and the node for the word "increasing" includes a second bias score 408b that is "32X". The node for the word "steadily" also includes a bias score that is "32X". Other nodes in the right sentence include scores such as "34X", "32X", or "17X".

The "X" included in these nodes indicate that this node has a bias score that is above a bias threshold, which means that the word or a combination of words exhibits a bias that should be corrected. In some embodiments, no bias score will be shown for certain nodes such as those representing an indefinite article. In other embodiments, every node may include a bias score.

The bias graphs allow the structure of bias in the text corpus to be understood through a visual representation. In some embodiments, the bias graph may subsequently be presented to a user via a GUI. In some embodiments, the bias graph is not shown to the user but nevertheless assists the text document bias identification and correction program 110a, 110b for bias identification and for bias locating. The bias graph for the second text corpus may be considered a global bias graph and may be constructed by determining a structural threshold and by propagating bias scores for any unknown nodes within the structural threshold. The bias graph may be formed taking into consideration a bias threshold that is input by the user and also a desired parsing type (syntactic, semantic, or both syntactic and semantic) that is input by the user. Based on these two inputs and based on an input bias score that was determined via the embedding comparison, the bias graph may be used to propagate a bias detection from tokens of interest to whole phrases or sentences of interest that are directly or indirectly related. This propagation occurs by using deep-learning-based graph analysis methods. This propagation and the bias graph help positively affect the ability of the generative model to better paraphrase alternative text suggestions for debiasing a text document.

The bias graph is mapped back to portions of the text corpus in order to highlight the appropriate text areas that need to be debiased and in order to allow user engagement and interactivity for generating the replacement text that is to be presented to the user as an option for substitution of the biased text.

The bias graph may include sentence level bias labels. For example, in the global bias graph 402 shown in FIG. 4a the right sentence has a first sentence level bias label 414a of "2". The left sentence has a sentence level bias label of "1". Neither of these sentence level bias labels includes an "X", which may indicate that these sentences do not have a bias above a bias threshold. In the local bias graph 410 shown in FIG. 4b, the right sentence has a second sentence level bias label 414b of "36X". The left sentence has a sentence level bias label of "35X". These sentence level bias labels include an "X", which may indicate that these sentences have a bias above a bias threshold.

The bias graph may include embedding of token level bias. Biased tokens that are based on sentence level bias labels or on root level bias levels may be self-attended. Self-attention is a positional embedding technique to help decrease running time and helps recognize which terms in which places in the text are significant to the task at hand, in this case to the debiasing task at hand, so that the identified portions are processed first. Self-Attention is a process by which one sequence of vectors is encoded into another sequence of vectors. Each of the original vectors is just a block of numbers that represents a word. Its corresponding encoded vector represents both the original word and its relationship with the other words around it.

Significance scores may be calculated for the biased tokens. Unbiased tokens that neighbor biased tokens or biased nodes may be attended to based on semantic/syntactic parsing and a hop-based propagation. Hop-based propagation is also a time-saving technique and includes updating biases or bias scores for nodes by hopping or skipping two or three nodes and assigning the same value to all nodes in the group, instead of updating the biased nodes one-by-one. Such hop-based propagation may be used to give biased scores, same as the scores for the neighboring nodes, for nodes that represent unknown words or tokens or for nodes that have an unknown level of bias. Tokens with low bias scores as calculated based on a bias feature vector/embedding may be pruned or depreciated to whole sentence/phrase information in a node that maintains syntactic/semantic information. The bias graph that is produced as a result may be a hierarchical graph representation showing where and how bias exists in the text corpus that is being examined, e.g., in the first text corpus.

In a step 210 of the process 200, a first biased text in the first text corpus is identified. This identification may occur by analyzing bias scores of nodes in the bias graph and by localizing the nodes that have a high bias score or that have a bias score above a bias threshold that was input. A high bias score in some embodiments may reflect a higher amount of bias for that word element. The locations of the bias in the first text corpus are detected and analyzed. This identification may also occur by comparing magnitudes of the bias embeddings in the bias embedding space B in the embedding model, because embeddings for unbiased text will have lower magnitude compared to biased tokens from the differential embedding method. The comparison of step 206 may result in an identification of a first biased text in the first text corpus. From word embeddings and, in some embodiments, from the corpora having been tagged with biased tokens for particular word sets, the deep learning model may be trained to identify or tag words that are biased based on the projections representing these words in the bias embedding space.

In a step 212 of the process 200, the text is masked so that the identified biased text will be visible but remaining portions of the first text corpus will not be visible when presented to a user via a GUI. This masking is helpful for subsequent step 216 in which the biased text is presented, because the masking helps focus the attention of a user on the text portion that needs a debiasing. The bias graphs that are generated may help localize the biased text so that the text bias identification and correction program 110a, 110b may identify which portions of the text, including the biased text and some surrounding text portions for context, should be presented to the user, and which portions of the text are not needed to be shown and, therefore, are not shown at a back-end GUI. This lack of showing may be considered a blocking or a masking.

In a step 214 of the process 200, a replacement text portion is generated. The replacement text portion may be a replacement or substitute for the first biased text that was identified in step 210. The replacement text portion may be or may include a first replacement text portion and may include an unbiased text. A portion of the second text corpus may correspond to the first biased text from the first text corpus, and the portion from the second text corpus may provide an unbiased way of explaining concepts from the corresponding first biased text. The replacement text portion may be taken from that portion of the second text corpus. A generative adversarial network or learning model that is a deep neural network may be used to generate the replacement text portion. The generative network/model may use an extraction function to extract from the global text corpus, at the identified text region, debiased words that are suitable replacements for the biased text found in the first text corpus. The replacement text portion may respect syntactic and semantic structure of the surrounding text so that the replacement text portion fits well into the first text corpus.

The generated replacement text may include a hypernym that may be used in the place of a biased hyponym. A hypernym is a superordinate or a word with a broad meaning under which a more specific word, e.g., a hyponym, falls. A hyponym is a term that denotes a subcategory of a more general class. A suitable hypernym may come from a hypernym table stored in a memory of or associated with the text document bias identification and correction program 110a, 110b, e.g., from a data storage device 106 or from a database 114. An example of a suitable hypernym may be "change" in place of the possibly-biased hyponyms "increase" or "decrease". Another example of a suitable hypernym may be "ruler" or "leader" in place of the possibly-biased hyponyms "king" or "queen". Another example of a suitable hypernym may be "the individual" or "the person" in place of the possibly-biased hyponyms "he/him" or "she/her". The text document bias identification and correction program 110a, 110b may be provided with a suitable hyponym-generator or a suitable hyponym-generator may be generated over time by the text document bias identification and correction program 110a, 110b through repeated iterations of the process 200 when more sets of text corpuses have been compared and more sets of second text corpuses or global text corpuses have been saved and have provided examples of debiased text.

The text document bias identification and correction program 110a, 110b may also include a synonym generator that may generate possible replacement synonyms for words, terms, or phrases that have been identified as being biased. Many programming languages and libraries include a synonym generator. For example, in the python programming library the following command may take positive entries of "woman" and "king" and negative entry "man" as inputs and may output "queen" as a suitable synonym replacement for the term "king":

model.most_similar(positive=['woman', 'king'], negative= ['man'], topn=10,
restrict vocab=None
[('queen', 0.50882536), . . . ]

The generation of step 214 may include applying context sensitive grammar for the generated replacement text, so that the replacement text portion fits grammatically correctly into the first text corpus. The generation may include using an AMR graph as a rooted, labeled, directed, acyclic graph that includes whole sentences. The generation may also include linearizing and combining rules from lexical resources and a machine learning approach, where inference without linguistic routes applies. The embedding model may be or may be part of a generative model that can be harnessed to generate the alternative text that will debias the biased text that is identified. A generative adversarial network that is a deep neural network may be used to generate the replacement text portion, using a global text corpus as a discriminator to help generate new substitute text without bias.

The transformation calculation output 306 shown in FIG. 3b may include changes to distances or angles of the word locations in the embedding space for the local embedding that would move the vector orientations to better match the vector orientations in the global embedding. FIG. 3b shows a set of tensor operations to transform the local embedding of "increase" to be closer to what is observed in the global unbiased text corpus. The generative adversarial network may use trial and error to find the transformation calculation output 306 that will most closely align the local embedding with the global embedding. The transformation calculation output 306 shows suggested vector changes regarding the word "increase" and not "revenue", because for this set of terms if the vectors are changed regarding the word "increase" it will achieve the debiasing even if no changes are made to the recitations of the word "revenue" in the first text corpus.

In at least some embodiments the replacement text portion may also include a second replacement text portion. Thus, in these embodiments both a first replacement text portion and a second replacement text portion may be generated as possible substitutes for a biased text that is identified. If multiple replacement text portions are generated as possible replacements or substitutes for the first biased text identified in step 214, the user may subsequently be provided an opportunity to choose between the various possible replacements or substitutes. Such a second or third replacement text portion may be taken from data stored in a memory of or associated with the text document bias identification and correction program 110a, 110b, e.g., from a data storage device 106 or from a database 114. Such a second or third replacement text portion may have been saved as being a suitable replacement for text that is the same as or similar to the first biased text that was identified in step 210. Such a second or third replacement text portion may alternatively be taken from a third text corpus if a third text corpus is used and loaded for an alternative comparison with the first text corpus (with the first replacement text portion coming from the second text corpus).

In a step 216 of the process 200, the biased text and the replacement text portion are presented. This presentation may be done visually through a GUI generated by the text document bias identification and correction program 110a, 110b. A user may see this GUI on a display such as display monitor 924 that is part of the computer 102. This presentation may also be done audibly via a speaker of the computer 102. This presentation may include a single replacement text portion being presented. This presentation may also include multiple replacement text portions, e.g., a first replacement text portion, a second replacement text portion, a third replacement text portion, etc., being presented as possible substitutes for the first biased text. The GUI may present multiple replacement text portion choices in an order based on a ranking of which choice will most decrease a bias score. For example, the GUI may present the multiple replacement text portion choices in a descending order, with the first or upper-most choice being that which will most decrease the bias score. This GUI may be considered a back-end user interface that works on top of the bias graph and on top of the alternative text generation to highlight bias and to help mitigate the detected bias in real time. The input from the user and the interactivity, e.g., via this back-end GUI, make this process 200 a semi-automated pipeline.

Step 218 of the process 200 represents a query of whether one or more of a user acceptance or selection of the replacement text portion(s) are to occur or if a user modification of the first biased text is to be allowed. This step 218 may depend on whether programming is present in the text document bias identification and correction program 110a, 110b to allow the user to perform step 220 or whether the programming is to automatically update the first text corpus with the generated replacement text portion.

If the query of step 218 results in an affirmative, in a step 220 an acceptance or a selection of the replacement text portion(s) is received or a user modification of the first biased text is received. In some embodiments, two or more choices of replacement text portions are presented to the user in step 216, so that step 220 will include the user selecting, e.g., via a GUI, e.g., in a scroll-and-click mechanism or a glide-and-click mechanism, one of the various replacement text choices to be the substitute for the biased text, e.g., for the first biased text, in the first text corpus. In other embodiments, a GUI presented to the user may give the user an option to type in their own text choice in order to debias the biased text. This manually input text may then be used in a subsequent step to update the first text corpus and to replace the biased text that was presented in step 216. In other embodiments, a GUI presented to the user may give the user an option to type in their own modification to the generated replacement text portion so that a modified replacement text portion is created. This modified replacement text portion may then be used in a subsequent step to update the first text corpus and to replace the biased text that was presented in step 216.

If the query of step 218 results in a negative or after completion of step 220, in a step 222 of the process 200 the first text corpus is updated by replacing the first biased text with alternative text, e.g., with unbiased text. The alternative text that is used may be a first replacement text that was generated in step 214 and that was accepted by the user in step 220. The alternative replacement text may be a first replacement text or a second replacement text. If the user has in step 220 selected one of various replacement text choices that were generated and presented, the selected replacement text will be used in step 222 for the updating of the first text corpus and for replacement of the first biased text. The new text that is used to replace the biased text may alternatively have been manually input by a user or may be a modification that the user made to the generated replacement text portion, e.g., in the GUI presented to the user. If no feedback from the user is received in a step 220, in a default the text document bias identification and correction program 110a, 110b may after a certain period of time, e.g., after fifteen seconds, automatically consider its own top suggestion as being the suitable replacement text for usage in the step 222.

If the step 218 is negative, as it may be for some embodiments, after the presentation of the biased text and the replacement text portion in step 216 the process 200 may automatically proceed in the step 222 of the process 200 to update the first text corpus by replacing the first biased text with the generated replacement text portion.

A query for step 224 helps to know whether steps 210 through 222 are to be repeated for instances when multiple regions or areas of the first text corpus have been identified as being biased. This step 224 may depend on whether the comparison in step 206 indicated that multiple different text areas of the first text corpus contain biased text. If multiple such biased areas were found, then programming of the text document bias identification and correction program 110a, 110b may cause the step 210 to be repeated to identify subsequent portions of biased text in the first text corpus. The steps through 222 may then be repeated to update the subsequent portion or portions of biased text in the first text corpus. This loop may be repeated multiple times until all biased portions of the first text corpus have been replaced.

In a step 226 of the process 200, the updated text corpus is delivered and stored. The updated text corpus may be delivered to the user, e.g., by being sent via the communication network 116 from the server 112 to the computer 102. The updated text corpus may be stored in the data storage device 106 or in the database 114 or in some other computer memory of or associated with the text document bias identification and correction program 110a, 110b. If the updating of step 222 occurs in a server away from the user or from the client, e.g., occurs in the server 112 that is separate from the computer 102, step 226 may include a file with the updated text corpus being transmitted from the server 112 to the computer 102 via the communication network 116. This transmission may be considered a delivery of the updated text corpus.

In a step 228 of the process 200, a bias score for the first text corpus is generated and a bias score for the updated text corpus is generated. These two generated bias scores are compared so that a bias reduction score is generated or determined. The bias reduction score may be part of modification metrics that are calculated. The bias score for the first text corpus may also be stored in a computer memory of or associated with the text document bias identification and correction program 110a, 110b, e.g., in the data storage device 106 or in the database 114 or in a database of another server. The bias scores may help track bias levels so that a text corpus that receives various modifications, e.g., as it is reviewed in various drafts, e.g., by various members or editors of an organization, may remain unbiased across the various modifications or after receiving additions.

In a step 230 of the process 200, the bias reduction score that was generated in step 228 is presented and stored. This presentation may be done visually through a part of the GUI in which the biased text was presented in step 216. Alternatively, this presentation may be done via a second GUI. A user may see this display as part of the GUI or as part of the second GUI on a display such as display monitor 924 that is part of the computer 102. This presentation may also be done audibly via a speaker of the computer 102. The bias reduction score may be stored in the data storage device 106 or in the database 114 or in another computer memory associated with the text document bias identification and correction program 110a, 110b. The bias reduction score helps track bias levels so that a text corpus that receives various modifications, e.g., as it is reviewed in various drafts, e.g., by various members or editors of an organization, may remain unbiased across the various modifications or after receiving additions.

In a step 232 of the process 200, the biased text and the replacement text portion that was used or the modified text that was entered are stored in a computer memory associated with the text document bias identification and correction program 110a, 110b. The biased text and the replacement text portion/modified text may be stored in a data table, e.g., in a debiasing table, within a memory associated with the text document bias identification and correction program 110a, 110b. The biased text and the replacement text portion/modified text may be stored, e.g., in the data table, in a linked manner. The biased text and the replacement text portion/modified text may be stored in the data storage device 106 or in the database 114. The biased text and the replacement text portion/modified text may be stored in a node of an embedding in an embedding model, e.g., of a neural network, of the text document bias identification and correction program 110a, 110b.

With this storage, in a subsequent iteration of the process 200 that is performed on a new different text corpus, the stored linked biased text-replacement text portion/modified text may be accessed for a generation of a suggestion for bias correction of a biased text in the new different text corpus, e.g., if the new biased text is similar to the biased text of the first text corpus of the first iteration.

After the performance of the step 232, the process 200 may end or may be performed in another iteration to correct bias in a new text that is submitted and received in a repeat of step 202. For this subsequent iteration, a new second text corpus may also be received or a global text corpus already stored in the system may be designated as the second text corpus or global text corpus that is considered unbiased.

In some embodiments, the text document bias identification and correction program 110a, 110b may generate different versions of the text corpus as the text corpus is being interactively modified based on input from the user and based on the alternative text generation taken from a global model, e.g., from a global text corpus. The tracking of bias across the different versions of a given text corpus may include word-to-word mapping across versions. This bias detection may provide a tracking mechanism for highlighting how bias is introduced into a text corpus across the different versions of the document that are produced, e.g., for highlighting bias differences between the current text corpus version and a previous text corpus version. Bias metrics of tokens/nodes or of entire text regions across the text corpus versions may be compared on the common dimension of bias. The bias tracking helps a text corpus to become debiased and then to remain debiased even if the text corpus is further edited for other purposes. Every version of the text corpus, their bias levels, and bias levels of individual tokens/nodes may be stored in cloud storage, e.g., in the database 114, so that a consistent record is kept irrespective of who edited the text corpus or irrespective of which device, e.g., computer 102, was used to interactively edit the text corpus using the text document bias identification and correction program 110a, 110b.

In one implementation, the text document bias identification and correction program 110a, 110b may be used to tackle text corpus bias related to gender association with a job role. For example, if a document always uses male gender-related terms to refer certain higher paying jobs or always uses female gender-related terms to refer to lower paying jobs, this document may be identified as including biased portions. A global text corpus which is an example of not using biased gender pronoun associations for job roles may be used to help debias the local text corpus. This task may be a type of gender pronoun resolution. A user may detect skewing of gender pronouns around a job role based on a number of occurrences of the set (gender pronoun-job role) appearing in a document. Embedding transformation techniques may be used as described above to find replacement candidates for the gender pronouns. The replacement candidate text portions may be hypernyms of words or may be other unbiased synonyms. The text document bias identification and correction program 110a, 110b may debias the first text corpus with respect to those job roles of interest or to all job roles discussed in the first text corpus.

The text document bias identification and correction program 110a, 110b may in another implementation be used to debias a text corpus that is a public financial report for a company. If a company has a problem with biased public financial reports that emphasize increases in revenues and ignore decreases in revenues, the text document bias identification and correction program 110a, 110b may help debias this financial report before it is released to the public. A reference corpus may provide an example of being unbiased in this regard, for example if the reference corpus describes its revenue with respect to both increases and decreases which may be considered a fairer and a more accurate representation of the finances of the company.

The text document bias identification and correction program 110a, 110b may provide flexibility to allow a user to define bias with respect to statistical occurrence and context. The text document bias identification and correction program 110a, 110b may provide users the ability to address bias in text while considering context dependency and all portions of the text corpus that are affected. The text document bias identification and correction program 110a, 110b helps provide quantifying and tracking of bias levels across various versions of text corpuses. The text document bias identification and correction program 110a, 110b helps enable machines to model the correct factors by learning on top of text corpuses that have had their biased portions removed so that the text corpuses are debiased texts.

The text document bias identification and correction program 110a, 110b may help track bias levels so that a text corpus that receives various modifications, e.g., as it is reviewed in various drafts, e.g., by various members or editors of an organization, may remain unbiased across the various modifications or after receiving additions. Thus, the text document bias identification and correction program 110a, 110b may help prevent the intentional or unintentional introduction of bias into a text document. The text document bias identification and correction program 110a, 110b may help track bias levels across ground truth as established by the global text corpus. The text document bias identification and correction program 110a, 110b may help track bias levels across predicted data point objects that are predicted by the machine learning model of the text document bias identification and correction program 110a, 110b. The text document bias identification and correction program 110a, 110b may constitute a semi-automated pipeline which refines a text corpus towards a required level of debiasing and allows the opportunity to allow input from a human expert when needed. The text document bias identification and correction program 110a, 110b may be implemented along with other NLP programs as methods to detect bias in text language that is parsed.

Figure 5:
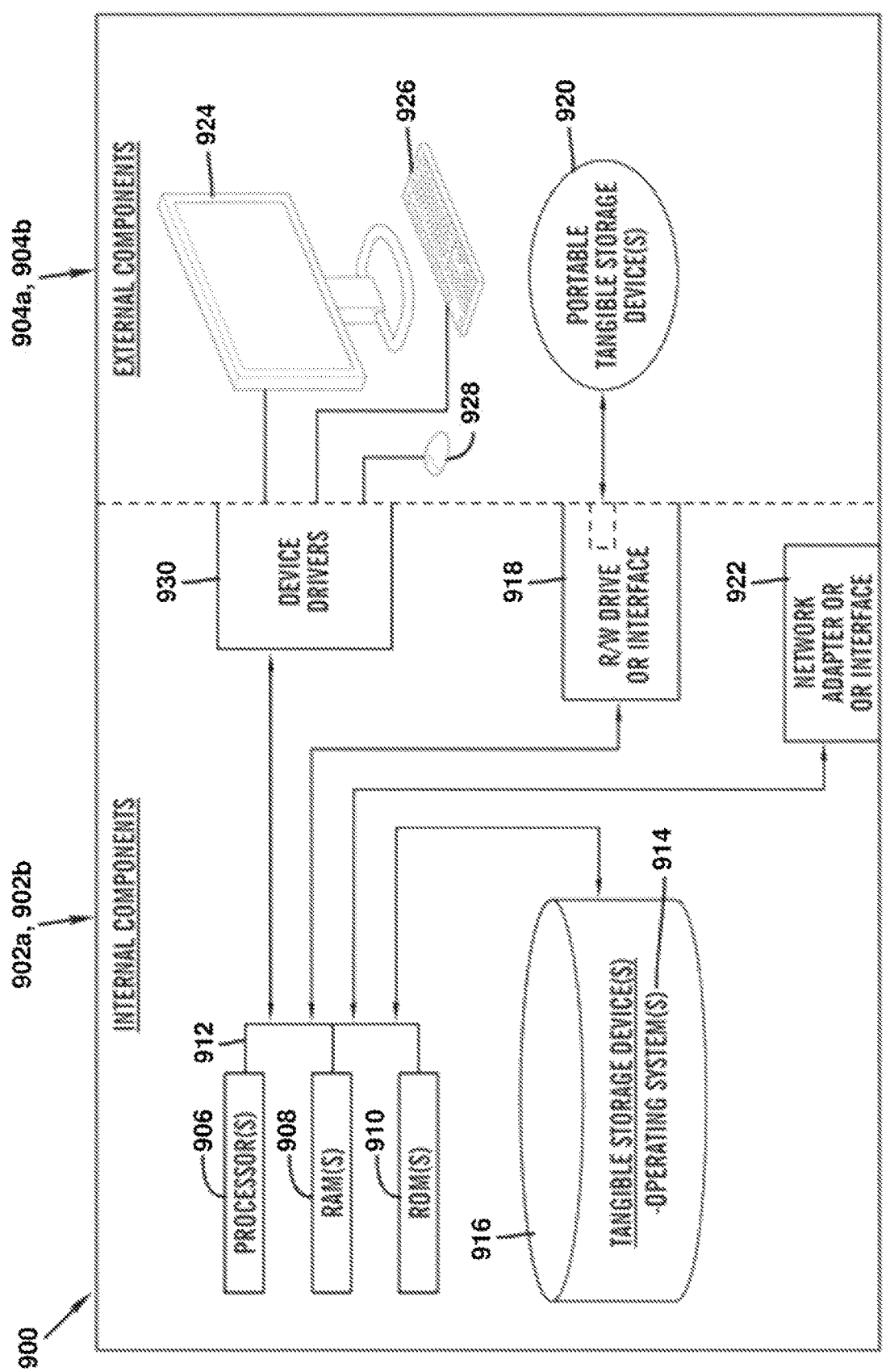
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902a, 902b, 904a, 904b is representative of any electronic device capable of executing machine-readable program instructions. Data processing system 902a, 902b, 904a, 904b may be representative of a smart phone, a computer system, PDA, or other electronic devices. Examples of computing systems, environments, and/or configurations that may represented by data processing system 902a, 902b, 904a, 904b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and server 112 may include respective sets of internal components 902a, 902b and external components 904a, 904b illustrated in FIG. 5. Each of the sets of internal components 902a, 902b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the text document bias identification and correction program 110a in client computer 102, and the text document bias identification and correction program 110b in server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory, or any other computer-readable tangible storage device that can store a computer program and digital information.

Each set of internal components 902a, 902b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the text document bias identification and correction program 110a, 110b can be stored on one or more of the respective portable computer-readable tangible storage devices 920, read via the respective R/W drive or interface 918 and loaded into the respective hard drive 916.

Each set of internal components 902a, 902b may also include network adapters (or switch port cards) or interfaces 922 such as a TCP/IP adapter cards, wireless wi-fi interface cards, or 3G or 4G wireless interface cards or other wired or wireless communication links. The software program 108 and the text document bias identification and correction program 110a in client computer 102 and the text document bias identification and correction program 110b in server 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the text document bias identification and correction program 110a in client computer 102 and the text document bias identification and correction program 110b in server 112 are loaded into the respective hard drive 916. The network may include copper wires, optical fibers, wireless transmission, routers, firewalls, switches, gateway computers and/or edge servers.

Each of the sets of external components 904a, 904b can include a computer display monitor 924, a keyboard 926, and a computer mouse 928. External components 904a, 904b can also include touch screens, virtual keyboards, touch pads, pointing devices, and other human interface devices. Each of the sets of internal components 902a, 902b also includes device drivers 930 to interface to computer display monitor 924, keyboard 926 and computer mouse 928. The device drivers 930, R/W drive or interface 918 and network adapter or interface 922 include hardware and software (stored in storage device 916 and/or ROM 910).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
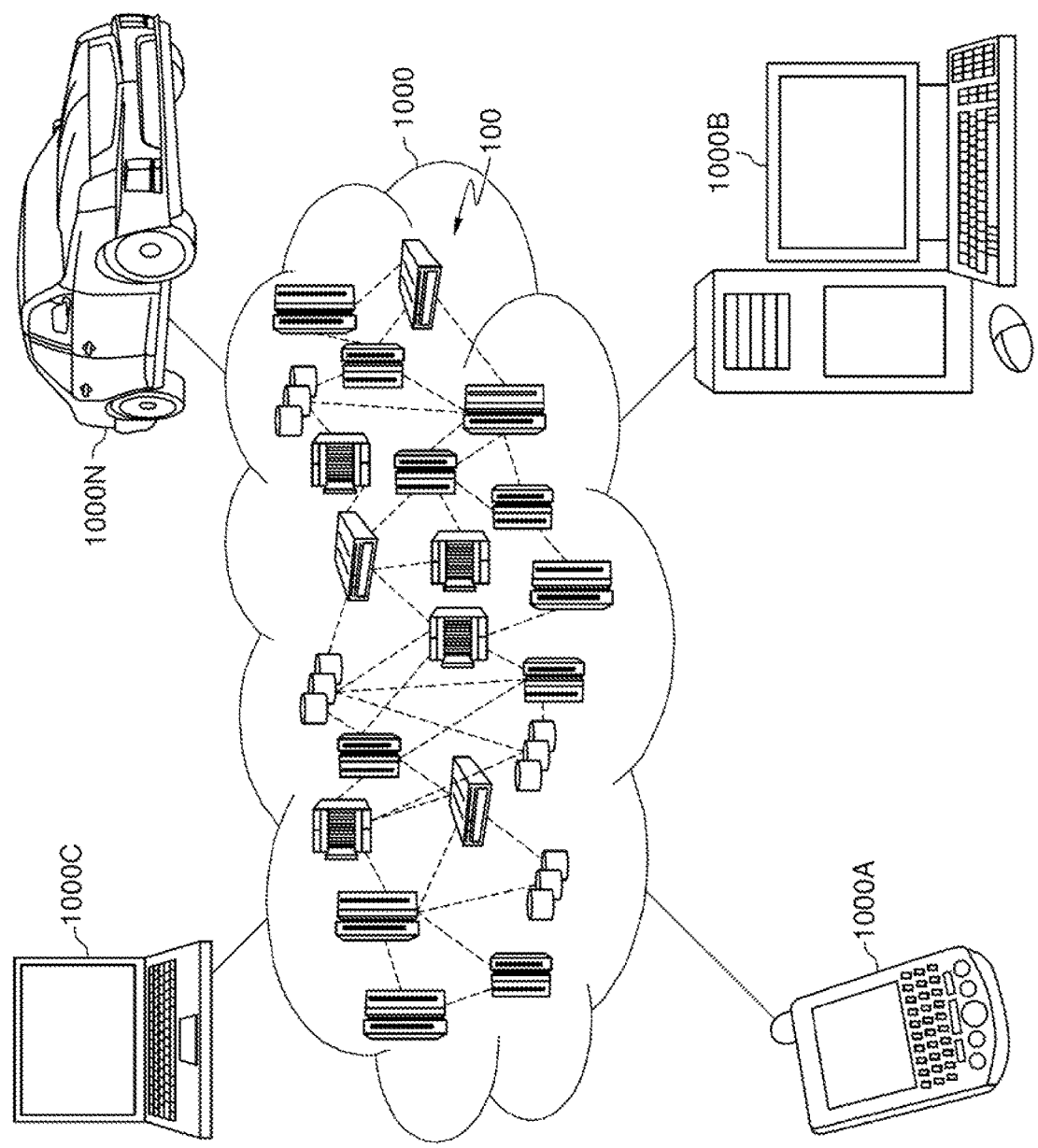
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
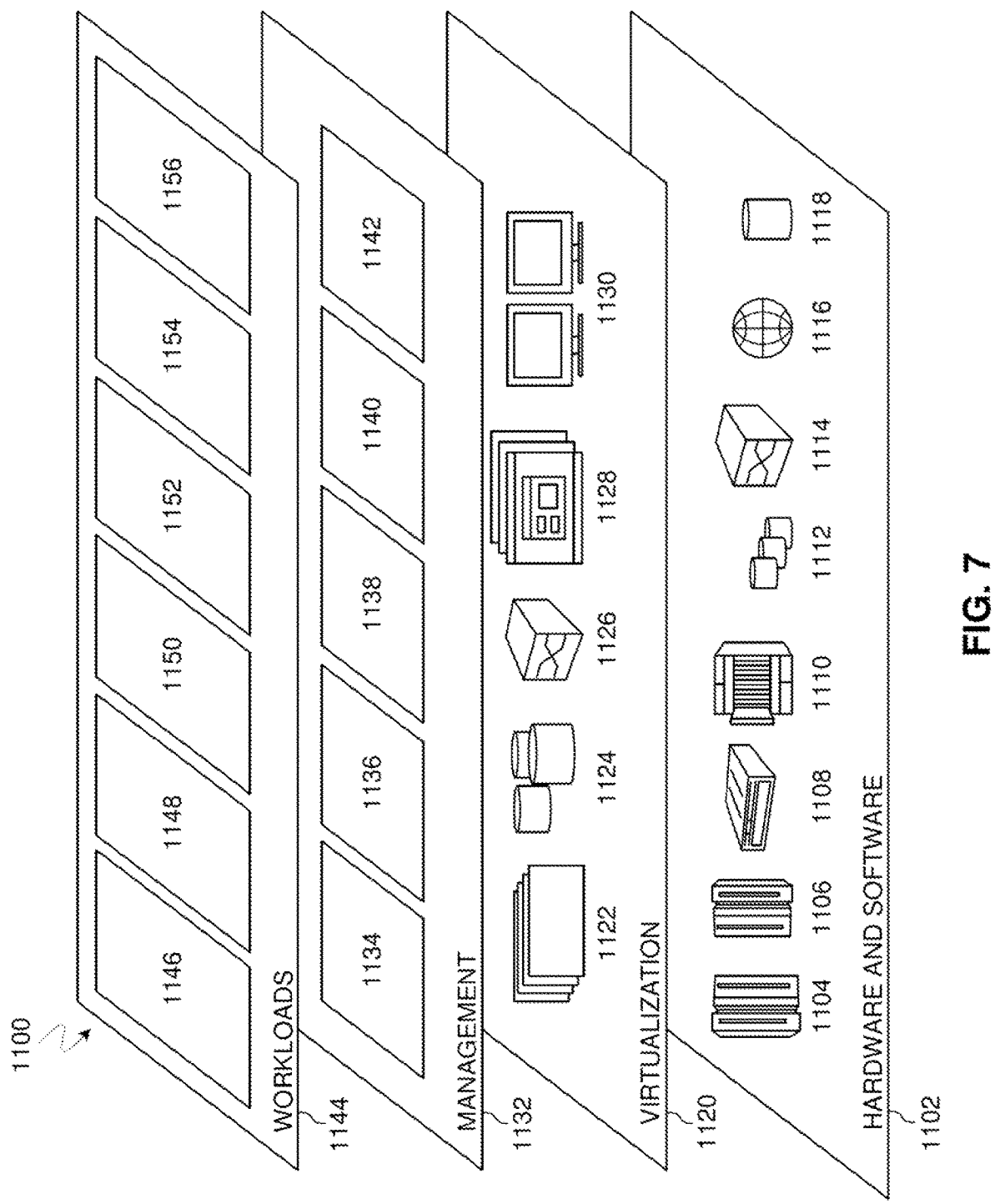
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and text document bias identification and correction 1156. A text document bias identification and correction program 110a, 110b provides a way to use artificial intelligence to identify bias in a text document and to help facilitate correction of the bias.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for correcting bias in text, the method comprising:
   receiving, via a computer system, a first text corpus;
   receiving, via the computer system, a designation of a second text corpus;
   embedding, via the computer system, words of the first text corpus as a first word embedding in an embedding model of the computer system;
   comparing, via the computer system, the first embedding to a second word embedding in the embedding model to identify a first biased text in the first text corpus, wherein the second word embedding is from the second text corpus;
   generating, via the computer system, a first replacement text portion as a substitute for the first biased text, wherein the first replacement text portion comprises a first unbiased text; and presenting, via the computer system, the first biased text and the first replacement text portion.

2. The method of claim 1, further comprising:
receiving, via the computer system, an acceptance of the first replacement text portion; and
after the receiving of the acceptance, replacing, via the computer system, the first biased text with the first replacement text portion so that the first text corpus is updated.

3. The method of claim 1, further comprising:
generating, via the computer system, a second replacement text portion as another substitute for the first biased text, wherein the second replacement text portion comprises a second unbiased text; and
presenting, via the computer system, the second replacement text portion.

4. The method of claim 3, further comprising:
receiving, via the computer system, an acceptance of the first replacement text portion or of the second replacement text portion; and
after the receiving of the first replacement text portion or of the second replacement text portion, replacing, via the computer system, the first biased text with the accepted first or second replacement text portion so that the first text corpus is updated.

5. The method of claim 1, further comprising:
receiving, via the computer system, a modification to the first replacement text portion to form a modified first replacement text portion, wherein the modification is generated by a user after the presenting of the biased text and after the presenting of the first replacement text portion; and
replacing, via the computer system, the biased text with the modified first replacement text portion so that the first text corpus is updated.

6. The method of claim 1, further comprising:
replacing, via the computer system, the first biased text with the first replacement text portion so that the first text corpus is updated.

7. The method of claim 1, further comprising:
generating, via the computer system, a bias graph, wherein the bias graph comprises interconnected word elements of the first text corpus and a respective bias score for the interconnected word elements, wherein the comparing of the first word embedding to the word second embedding generates the respective bias score; and
localizing the first biased text within the first text corpus, wherein the localizing uses the bias graph.

8. The method of claim 1, wherein the first biased text is presented in a masked form with respect to remaining portions of the first text corpus.

9. The method of claim 2, further comprising:
generating, via the computer system, a bias score of the first text corpus; and
storing, via the computer system, the bias score and the updated first text corpus.

10. The method of claim 2, further comprising:
generating, via the computer system, a first bias score for the first text corpus;
generating, via the computer system, a second bias score for the updated first text corpus;
comparing, via the computer system, the first bias score to the second bias score to determine a bias reduction score; and
presenting, via the computer system, the bias reduction score.

11. The method of claim 1, wherein the first replacement text portion is from the second text corpus.

12. The method of claim 1, wherein the first replacement text portion is from a computer memory in the computer system.

13. The method of claim 2, further comprising storing, in the computer system, the updated first text corpus.

14. The method of claim 2, further comprising:
storing, in a memory in the computer system, the first replacement text portion and the first biased text in a linked manner.

15. A computer system for correcting bias in text, the computer system comprising:
one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
receiving a first text corpus;
receiving a designation of a second text corpus;
embedding words of the first text corpus as a first word embedding in an embedding model;
comparing the first word embedding to a second word embedding in the embedding model to identify a first biased text in the first text corpus, wherein the second word embedding is from the second text corpus;
generating a first replacement text portion as a substitute for the first biased text, wherein the first replacement text portion comprises a first unbiased text; and
presenting the first biased text and the first replacement text portion.

16. The computer system of claim 15, wherein the method further comprises:
receiving an acceptance of the first replacement text portion; and
replacing the first biased text with the first replacement text portion so that the first text corpus is updated.

17. The computer system of claim 15, wherein the method further comprises:
generating a second replacement text portion as another substitute for the first biased text, wherein the second replacement text portion comprises a second unbiased text; and
presenting the second replacement text portion.

18. A computer program product for correcting bias in text, the computer program product comprising a computer-readable storage medium having program instructions embodied therewith, wherein the program instructions are executable by a computer system to cause the computer system to perform a method comprising:
receiving a first text corpus;
receiving a designation of a second text corpus;
embedding words of the first text corpus as a first word embedding in an embedding model;
comparing the first word embedding to a second word embedding in the embedding model to identify a first biased text in the first text corpus, wherein the second word embedding is from the second text corpus;
generating a first replacement text portion as a substitute for the first biased text, wherein the first replacement text portion comprises a first unbiased text; and
presenting the first biased text and the first replacement text portion.

19. The computer program product of claim 18, wherein the method further comprises:
- receiving an acceptance of the first replacement text portion; and
- replacing the first biased text with the first replacement text portion so that the first text corpus is updated.

20. The computer program product of claim 18, wherein the method further comprises:
- generating a second replacement text portion as another substitute for the first biased text, wherein the second replacement text portion comprises a second unbiased text; and
- presenting the second replacement text portion.

\* \* \* \* \*